March 5, 1935.                H. D. FOWLER                1,992,941
                           AIRPLANE CONSTRUCTION
                           Filed April 1, 1932          3 Sheets-Sheet 1
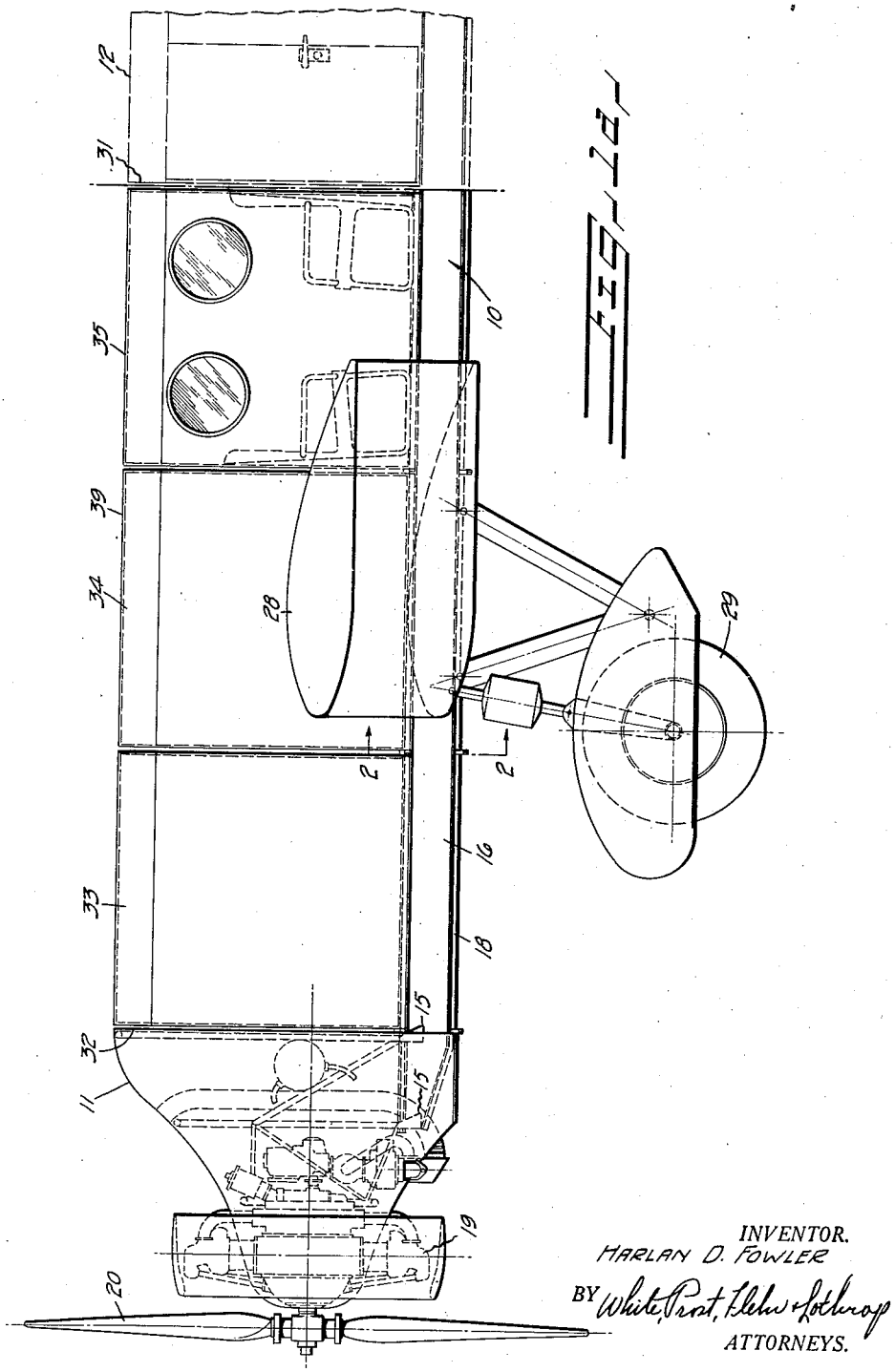
INVENTOR.
HARLAN D. FOWLER
BY
ATTORNEYS.

March 5, 1935.  H. D. FOWLER  1,992,941
AIRPLANE CONSTRUCTION
Filed April 1, 1932  3 Sheets-Sheet 2
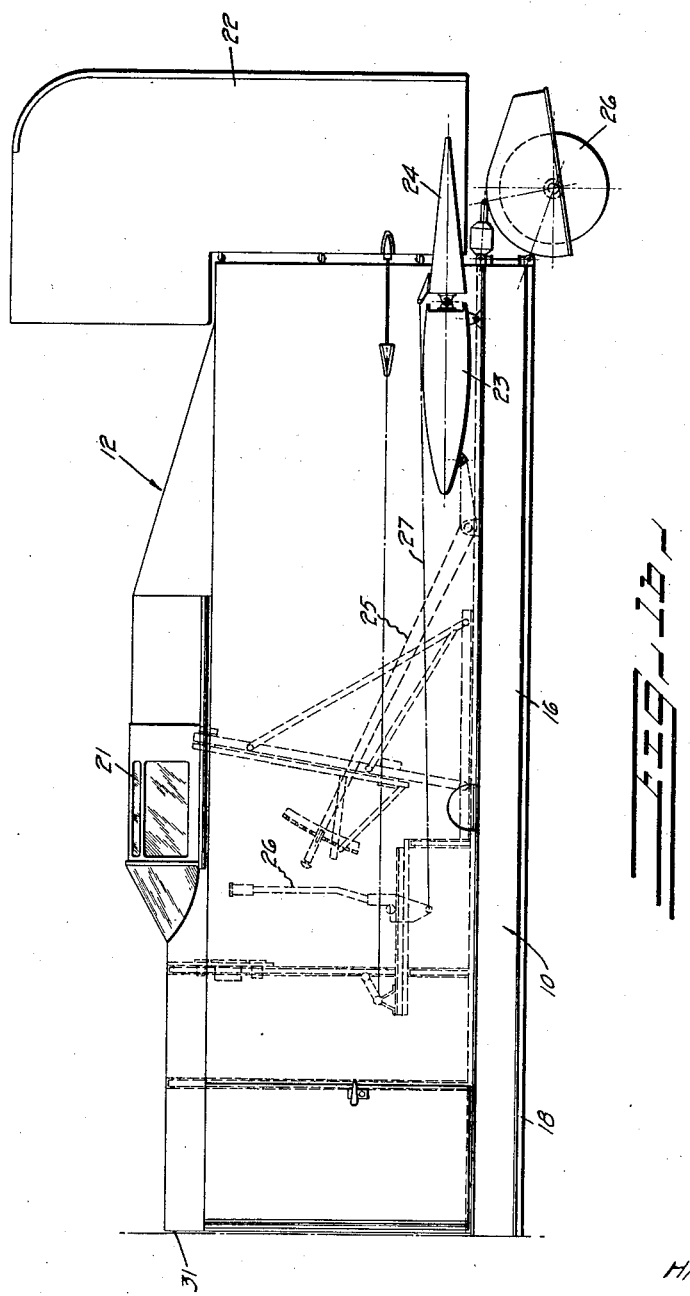
INVENTOR.
HARLAN D. FOWLER
BY
ATTORNEYS.

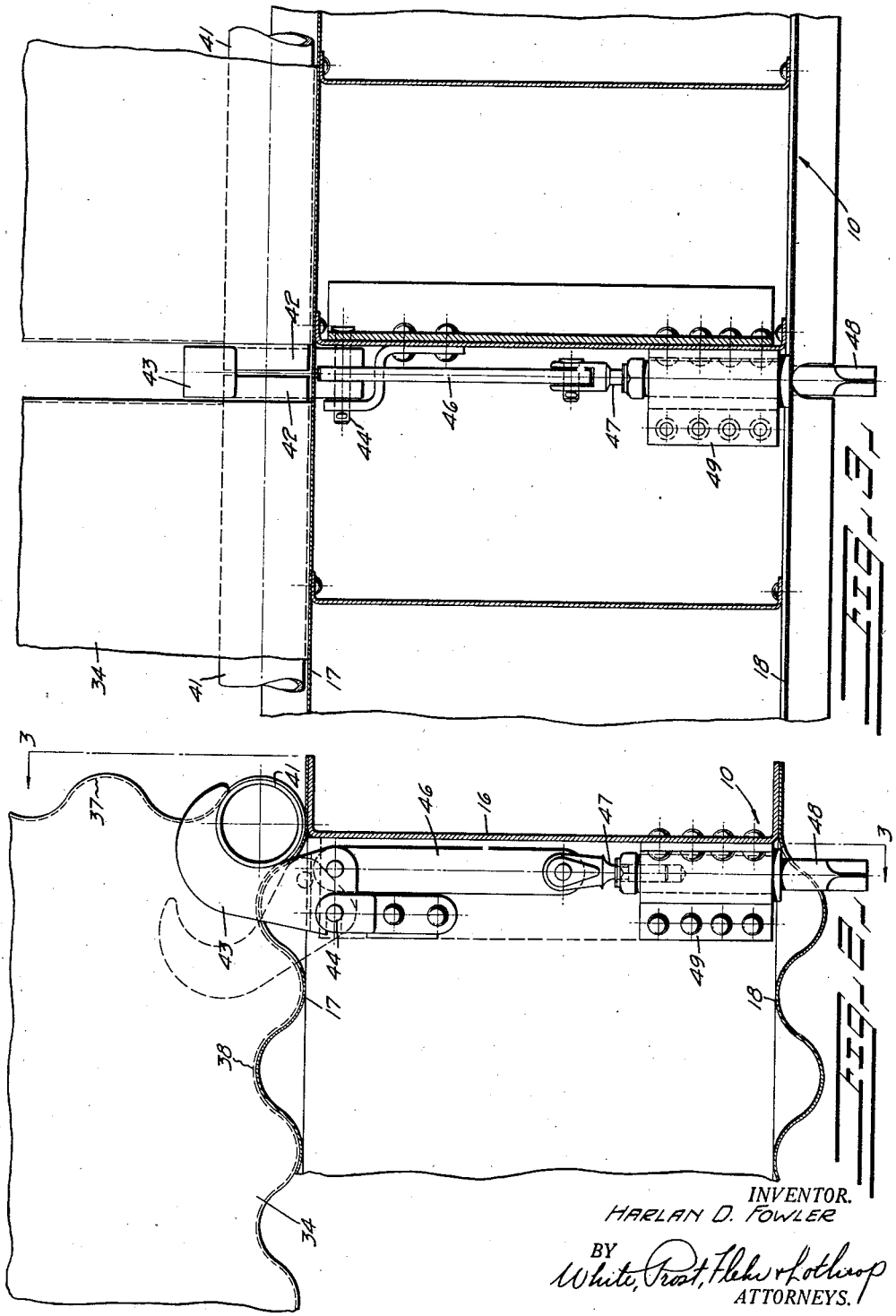

Patented Mar. 5, 1935

1,992,941

UNITED STATES PATENT OFFICE 1,992,941

AIRPLANE CONSTRUCTION

Harlan D. Fowler, San Francisco, Calif., assignor of one-half to Paul D. Flehr, San Mateo, Calif.

Application April 1, 1932, Serial No. 602,478

7 Claims. (Cl. 244—30)

This invention relates generally to the construction of airplanes, particularly those adapted for the carrying of air express and freight.

It is a general object of the invention to devise an airplane construction of the above character which will facilitate the loading and removal of cargo or freight.

It is a further object of the invention to devise an airplane in which the loading and unloading of cargo can also be carried out in such a manner as to insure proper distribution of the load.

A further object of the invention is to provide for ready detachability and replacement of certain parts of an airplane which are apt to require servicing or repair, as for example the power plant installation.

Further objects of the invention will appear from the following description in which a preferred embodiment of the invention has been set forth in detail in conjunction with the accompanying drawings. It is to be understood that the appended claims are to be accorded a range of equivalents consistent with the state of the prior art.

Referring to the drawings:

Figs. 1a and 1b are side elevational views, which when taken together, illustrate an airplane construction incorporating the present invention.

Fig. 2 is an enlarged cross sectional detail taken along the line 2—2 of Fig. 1a.

Fig. 3 is a cross sectional detail taken along the line 3—3 of Fig. 2.

Referring to Figs. 1a and 1b of the drawings, the airplane illustrated therein consists of a fuselage formed of an elongated platform section 10, a forward stream lined nose section 11, and a rear stream lined tail section 12. The depth or vertical dimension of platform section 10 is relatively small compared to the total depth of the fuselage, although by suitable internal trussing, it is made sufficiently strong to carry substantially all of the stresses to which the fuselage is subjected. Fig. 2 indicates a practical construction for the platform section 10, in which it is shown formed of side walls 16 of sheet metal, and longitudinally corrugated upper and lower walls 17 and 18.

Nose section 11 preferably carries the motor 19, propeller 20, and other parts which are necessarily auxiliary equipment for the motor. The mounting between nose section 11 and forward end of platform section 10, is preferably a readily detachable one, for example at points 15, so that the nose section and its associated parts can be removed as a unit, for replacement or repair.

The tail section 12 is preferably provided with a cockpit 21 to accommodate a pilot, together with one or more passengers if desired. Suitable controls are mounted within this cockpit, for proper operation of the plane. This tail section carries the usual vertical rudder 22, and stabilizers 23 provided with movable elevators 24. A landing wheel 26 is also shown carried by the rear end of platform section 10. As means for controlling the elevators 24, I have shown the usual control lever or stick 26, connected with the elevators by means of cables or rods. Suitable main wings 28 are carried by the intermediate portion of the platform section 10. Beneath the main wings, the platform section also carries a suitable landing gear 29. As simplified means for adjusting stabilizers 23, I have shown a pivoted lever 25 directly connected to the stabilizers.

Referring to Fig. 1a, it will be noted that the forward end wall 31 of the tail section 12, is spaced rearwardly a substantial distance from the opposed end wall 32 of the nose section 11. Between end walls 31 and 32, there is a vertical cargo receiving slot, which is accessible from the top and side of the fuselage. This vertical slot or space above the intermediate portion of platform section 10 is adapted to accommodate a plurality of cargo containers designated 33, 34 and 35. While these containers can be variously constructed, they are preferably formed of corrugated sheet metal as shown in Fig. 2. Thus container in Fig. 2 is provided with corrugated sheet metal side walls 37, and a corrugated bottom wall 38. Each container is also shown provided with a hinged cover or top wall 39, which can likewise be made of corrugated sheet metal.

The cargo containers described above are adapted to be removably locked upon the upper surface of the platform section 10, between the walls 31 and 32. A suitable locking means which can be quickly engaged and released is illustrated in Figs. 2 and 3. In this case hollow pipes 41 are fixed within the lower side edges of each cargo container. The end portions 42 of these pipes protrude a short distance from the end walls of the containers as shown in Fig. 3. These end portions 42 are adapted to be engaged by hook shaped members 43. Each of the hook shaped members 43 is pivotally carried by the platform section 10 as by means of pivotal connection 44, and is likewise pivotally connected with a link 46. The lower end of each link 46 is pivotally connected to a rod 47, having a threaded engagement with a shaft 48. Each of the shafts 48 is journalled to the platform section 10, as by means of a journal block 49. Upon turning shaft 48, as by means of a wrench or handle, hook shaped members 43 can be swung to out-of-the-way positions to permit removal of the cargo containers, or can be securely engaged with the end portions 42 of pipes 41, to lock the containers to the platform section. In addition to the locking means just described, lateral shifting of the cargo containers is also prevented by virtue of the interfitting relationship afforded between the corrugations on the upper surface of the platform section, and the complementary corrugations upon the bottom walls of the cargo containers, as shown in Fig. 2.

When all of the cargo containers are mounted between the walls 31 and 32, the stream lining of the fuselage is complete with respect to the nose and tail sections 11 and 12. In other words the cargo containers are so proportioned that their upper surfaces are contiguous with the upper surfaces of the nose and tail sections, and their side surfaces are likewise contiguous with the side surfaces of the nose and tail sections, and with the side surfaces of the platform section 10.

As is well understood in the art, in loading express or freight airplanes, the center of gravity of the load should be properly disposed if maneuvering ability of the plane is not to be adversely affected. With my construction, the main wings 28 of the plane are carried by the platform section 10, intermediate the slot or space between walls 31 and 32, and properly located with respect to the center of gravity of the airplane. Since a plurality of cargo sections are provided, it is evident that these separate containers can be so loaded, or so positioned upon the platform section after loading, that the center of gravity of the entire load is at or near the point desired.

It is evident that my construction has great utility over airplane constructions previously designed for carrying express or freight. Upon landing a plane carrying a cargo, it is only necessary to unlock the cargo containers from the platform section and then lift the same bodily from the fuselage. These cargo containers can then be discharged and reloaded for replacement upon the plane, or other loaded containers can be immediately replaced upon the platform section and properly locked in position. If desired, one or more of the cargo compartments can be fitted for the carrying of passengers as has been indicated for the container 35 in Fig. 1a. In this case it is evident that either this container should have a side door to provide entry for the passengers, or an end door should be provided to permit the passengers to enter and leave the container from the tail section 12.

In the event it is desired to fly the plane without the containers, a suitable one-piece cowl can be provided for enclosing the entire space between end walls 31 and 32. Likewise in the carrying of bulk cargo, the separate cargo containers can be omitted, the cargo placed directly upon the intermediate portion of the platform section, and the cargo then covered over with the cowl referred to above. Internal straps can be provided to prevent the bulk cargo from shifting or from coming loose in the event of bad weather flying.

I claim:

1. In an airplane construction, a fuselage comprising an elongated cantilever platform section, a stream lined nose section secured to the forward end of the platform section, the upper surface of the nose section extending a substantial distance above the upper surface of the platform section, a stream lined tail section secured to the rear end portion of the platform section, the upper surface of said tail section likewise extending a substantial distance above the upper surface of the platform section, the rear end wall of the nose section being spaced a substantial distance from the forward end wall of the tail section, thereby forming a cargo receiving space, main supporting wings secured to that portion of the platform section extending between the forward end wall of the tail section and the rear end wall of the nose section, whereby said wings are in the zone of the cargo space, and a plurality of cargo receiving containers detachably mounted upon the intermediate portion of the platform section between said end walls of the nose and tail sections, the upper walls of said containers, and the side walls of said containers, together with the side walls of said platform section, completing the stream lining of the fuselage, and means including parts extending upwardly thru the platform section for releasably locking the containers to the upper surface of the platform section.

2. An airplane adapted to receive cargo containers shaped to conform to the streamlining thereof, said airplane comprising a fuselage having streamlined nose and tail portions, a cantilever platform section interconnecting said nose and tail portions, the rear and forward end walls of said nose and tail portions respectively extending for a substantial distance above the top of the platform section and being spaced apart to form an open space for receiving the cargo containers, and main supporting wings secured to the platform section in the zone of said space.

3. An airplane adapted to receive containers shaped to conform to the streamlining thereof, said airplane comprising a fuselage having a cantilever platform section extending substantially the entire length of the same, a streamlined nose section secured to the forward end of the platform section, motive means carried by said nose section, said nose section extending for a substantial distance above the upper surface of the platform section, a streamlined tail section secured to the rear portion of said platform section, the upper surface of said tail section likewise extending a substantial distance above the upper surface of the platform section, and the forward end wall of said tail section being spaced a substantial distance behind the rear end wall of the nose section whereby an open cargo space is provided above an intermediate portion of the platform section, and main supporting wings secured to the platform section in the zone of the cargo space.

4. In an airplane construction, a fuselage comprising an elongated cantilever platform section, a streamlined nose section secured to the forward end of the platform section, the upper surface of the nose section extending a substantial distance above the upper surface of the platform section, a streamlined tail section secured to the rear end portion of the platform section, the upper surface of said tail section likewise extending a substantial distance above the upper surface of the platform section, the rear end wall of the nose section being spaced a substantial distance from the forward end wall of the tail section, thereby forming a cargo-receiving space, main supporting wings secured to that portion of the platform section extending between the forward end wall of the tail section and the rear end wall of the nose section, whereby said wings are in the zone of the cargo space, and a plurality of cargo-receiving containers detachably mounted upon the intermediate portion of the platform section between said end walls of the nose and tail sections, the upper walls of said containers, and the side walls of said containers, together with the side walls of the platform section, completing the streamlining of the fuselage, and means including parts extending upwardly through the platform section for releasably locking the containers to the upper surface of the platform section.

5. In an airplane construction, a fuselage comprising an elongated cantilever platform section, a streamlined nose section secured to the forward end of the platform section, the upper surface of the nose section extending a substantial distance above the upper surface of the platform section, a streamlined tail section secured to the rear end portion of the platform section, the upper surface of said tail section likewise extending a substantial distance above the upper surface of the platform section, the rear end wall of the nose section being spaced a substantial distance from the forward end wall of the tail section, thereby forming a cargo-receiving space, the top of said platform section within said space being corrugated, main supporting wings secured to that portion of the platform section extending between the forward end wall of the tail section and the rear end wall of the nose section, whereby said wings are in the zone of the cargo space, and a cargo-receiving container detachably mounted upon the intermediate portion of the platform section between said end walls of the nose and tail sections, the upper walls of said container, and the side walls of said container, together with the side walls of the platform section, completing the streamlining of the fuselage, and the bottom of said container being corrugated to interfit the corrugations in the top of the platform section, and means including parts extending upwardly through the platform section for releasably locking the container to the upper surface of the platform section.

6. In an airplane construction, a fuselage comprising an elongated cantilever platform section, a streamlined nose section secured to the forward end of the platform section, the upper surface of the nose section extending a substantial distance above the upper surface of the platform section, a streamlined tail section secured to the rear end portion of the platform section, the upper surface of said tail section likewise extending a substantial distance above the upper surface of the platform section, the rear end wall of the nose section being spaced a substantial distance from the forward end wall of the tail section, thereby forming a cargo receiving space, the depth of said cargo space caused by having the depth or thickness of said cantilever platform appreciably smaller than the width of the platform and substantially shallower than the overall depth of the fuselage, the top of said platform being longitudinally corrugated and having internal bulkheads stiffening said corrugated top, a plurality of containers carried in the space upon said platform, the bottom of said containers being corrugated to interfit with the corrugations upon the top of said platform, and the sides and top of said containers and the sides and bottom of said platform being shaped to conform with the streamlining of the fuselage, and releasable locking means comprising an eccentrically operable hook and screw to interlock with the containers thus forcibly holding down the bottom corrugations of the containers into matched relation with the top of said platform to thereby prevent shifting of the containers during inverted or turning flight, the containers being wholly above and partially over the main supporting wings and capable of being so disposed in static relation to the center of gravity to thereby maintain the airplane in aerodynamic equilibrium in the event said containers are unequally loaded for flight.

7. In an airplane construction, a fuselage comprising an elongated cantilever platform section, a streamlined nose section secured to the forward end of the platform section, the upper surface of the nose section extending a substantial distance above the upper surface of the platform section, a streamlined tail section secured to the rear end portion of the platform section, the upper surface of said tail section likewise extending a substantial distance above the upper surface of the platform section, the rear end wall of the nose section being spaced a substantial distance from the forward end wall of the tail section, thereby forming a cargo receiving space, the depth of said cargo space caused by having the depth or thickness of said cantilever platform appreciably smaller than the width of the platform and shallower than the overall depth of the fuselage, the top of said platform being longitudinally corrugated and having internal bulkheads stiffening said corrugated top, a container carried in the space upon said platform, the bottom of said container being corrugated to interfit with the corrugations upon the top of said platform, and the sides and top of said container and the sides and bottom of said platform being shaped to conform with the streamlining of the fuselage, and releasable locking means comprising an eccentrically operable hook and screw to interlock with the container thus forcibly holding down the bottom corrugations of the container into matched relation with the top of said platform to thereby prevent shifting of the container during inverted or turning flight, the container being wholly above the main supporting wings and capable of being so disposed in static relation to the center of gravity to thereby maintain the airplane in aerodynamic equilibrium in the event said container is unequally loaded for flight.

HARLAN D. FOWLER.